United States Patent [19]

Heske et al.

[11] 4,059,128
[45] Nov. 22, 1977

[54] DIGITAL PRESSURE STANDARD

[75] Inventors: William Albert Heske, Fairfield; Christopher Peter Grudzien, Milford, both of Conn.

[73] Assignee: Dresser Industries, Inc., Dallas, Tex.

[21] Appl. No.: 666,288

[22] Filed: Mar. 12, 1976

[51] Int. Cl.² .......................................... G05D 16/20
[52] U.S. Cl. .................................. 137/487.5; 137/85
[58] Field of Search ............... 137/85, 86, 487.5, 488, 137/489, 492, 492.5

[56] References Cited

U.S. PATENT DOCUMENTS

| | | | |
|---|---|---|---|
| 3,315,250 | 4/1967 | Higgins | 137/85 X |
| 3,726,296 | 4/1973 | Friedland | 137/487.5 X |
| 3,914,581 | 10/1975 | Gilson | 137/487.5 X |

Primary Examiner—Robert G. Nilson
Attorney, Agent, or Firm—Daniel Rubin

[57] ABSTRACT

Pressure regulator system and apparatus for producing a controlled output pressure corresponding to a preprogrammed BCD set point command. Measured values of output fluid pressure emitted from the regulator is applied in BCD signal form to electronic logic in which the measured signal is compared with the signal of the set point. In response to a determined differential between signals, output pressure is changed in a series of repetitive but rate variable differential reduction steps until set point pressure is achieved. In each step a D. C. motor under control of a logic actuated servo-system operates a force balanced air system to adjust a primary control pressure which in turn operatively resets the output pressure of the regulator.

14 Claims, 11 Drawing Figures

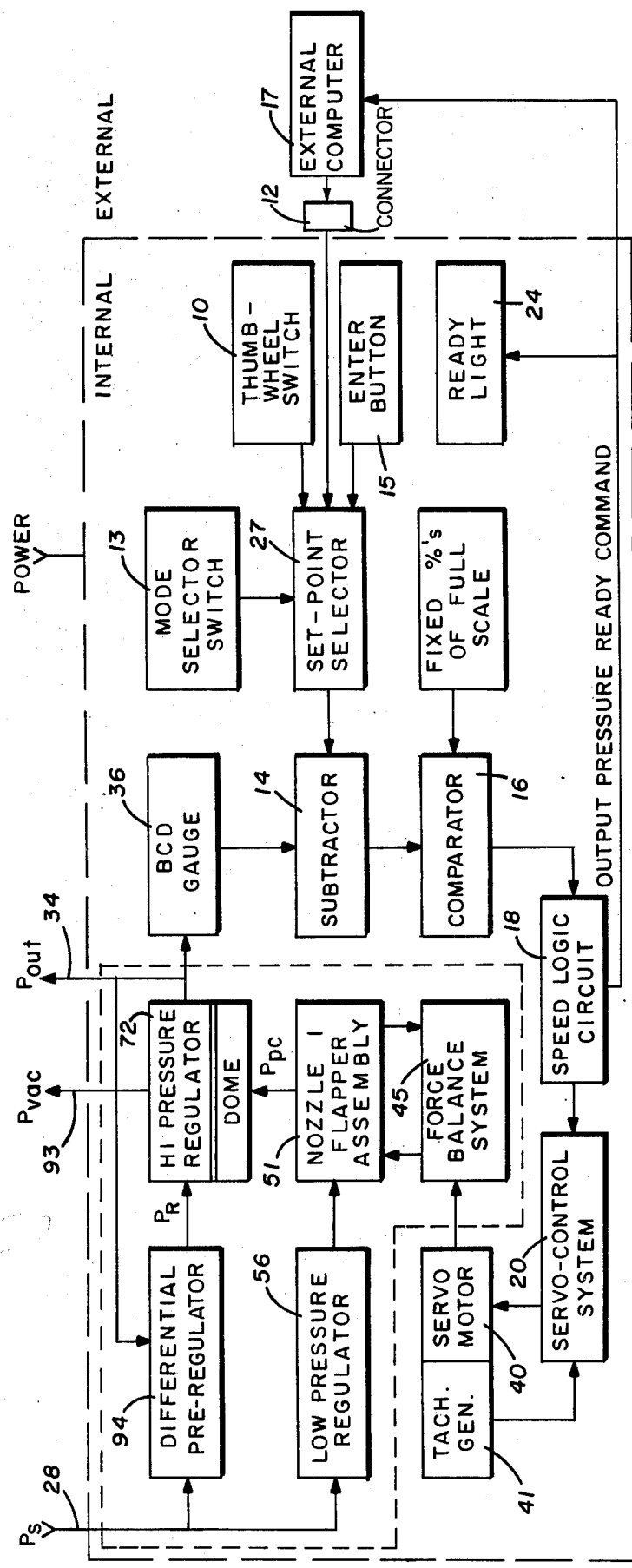
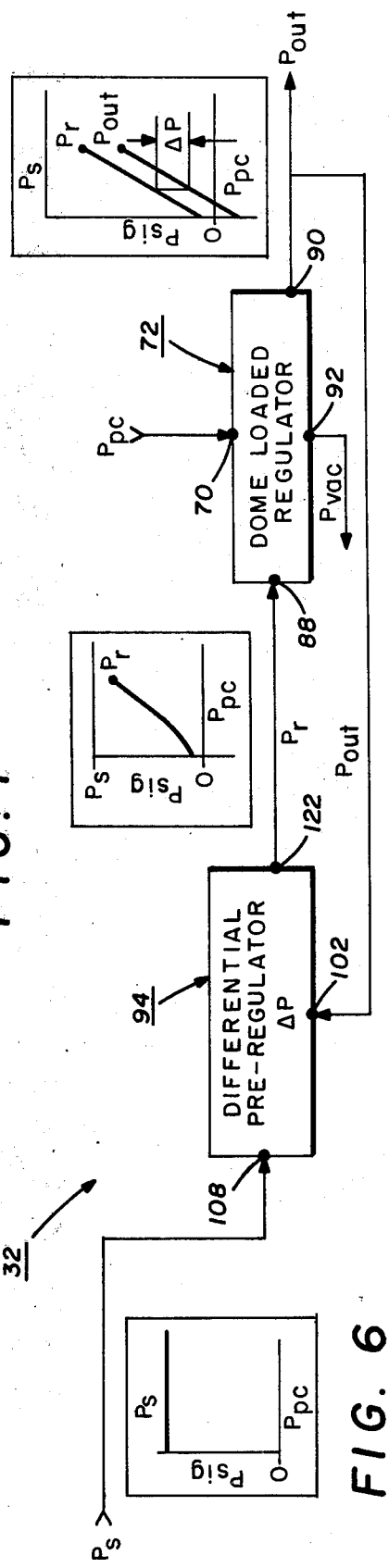
FIG. 1
FIG. 6

DIGITAL PRESSURE STANDARD

BACKGROUND OF THE INVENTION

1. The field of art to which the invention pertains comprises the art of fluid handling including apparatus for selfcompensated fluid pressure control.

2. A common need that frequently arises in both industry and science is the requirement to supply fluid for a variety of purposes at carefully controlled predetermined values of pressure. One such purpose may be for the calibration of instruments or control devices to ensure accuracy of their operation while another may be for direct external pressure monitoring. For these situations and others, various programmable pressure control apparatuses are commercially available and/or are known in the art as exemplified by prior art U.S. Pat. No. 3,113,582; 3,482,588; 3,315,250; and 3,598,138.

While apparatus of the prior art has undoubtedly functioned well in meeting the variety of requirements for which they have been used they frequently are characterized as being analog in nature and of only moderate accuracy subject to such other deficiencies as calibration shift or the like. Despite recognition of the foregoing limitation, it has not heretofore been known how to construct a highly accurate BCD operated pressure control system less prone to the calibration shift and other inaccuracies of the prior art.

SUMMARY OF THE INVENTION

The invention relates to pressure regulating system and apparatus and more specifically to such system and apparatus that is self-regulating and digitally programmable to provide controlled values of digitally displayed fluid pressures corresponding to a BCD set point command. The apparatus is self-contained adapted for convenient rack mounting or bench service and by virtue of its construction affords a secondary pressure standard with accuracy on the order of 0.03 percent of full scale that is maintained to on the order of plus or minus 0.02 percent.

This is achieved in accordance herewith by a self-contained apparatus in which a BCD (binary-coded decimal) set point command signal is supplied to control logic optionally by either an internally operable five digit selector switch or an externally operable BCD, TTL (transistor-transistor logic) compatible input command. By means of a BCD signal emitting pressure sensor system values of emitted fluid pressure are continuously measured and converted to a BCD signal similarly supplied to the control logic. Based on the differential between received signals the logic, via a servo control system, operates a D. C. motor of a force balanced pneumatic transmitter for effecting changes in primary control pressure in a series of repetitive steps. System pressure of fluid being supplied through a variably adjustable secondary regulator is continually reset by changes in the primary control pressure acting as a pilot until set point system pressure is achieved. By the rate of change of pressure versus time function being ramped automatically and asymptotically toward set point value, rapid coincidence is obtained without the adverse effects of overshooting.

It is therefore an object of the invention to provide a novel pressure regulator apparatus for producing a controlled output pressure corresponding to a programmable BCD set point command.

It is a further object of the invention to provide a novel pressure regulator apparatus of the previous object utilizing a variable rate error reduction in achieving set point operation.

It is a still further object of the invention to achieve the foregoing objects with apparatus that is relatively simple in construction while affording high level of performance accuracy.

BRIEF DESCRIPTION OF THE DRAWINGS

FIG. 1 is a flow chart of the operational system of the apparatus;

FIG. 6 is a partial flow chart and graphical representation for the secondary high/low pressure regulator of FIG. 5;

Figure 2:
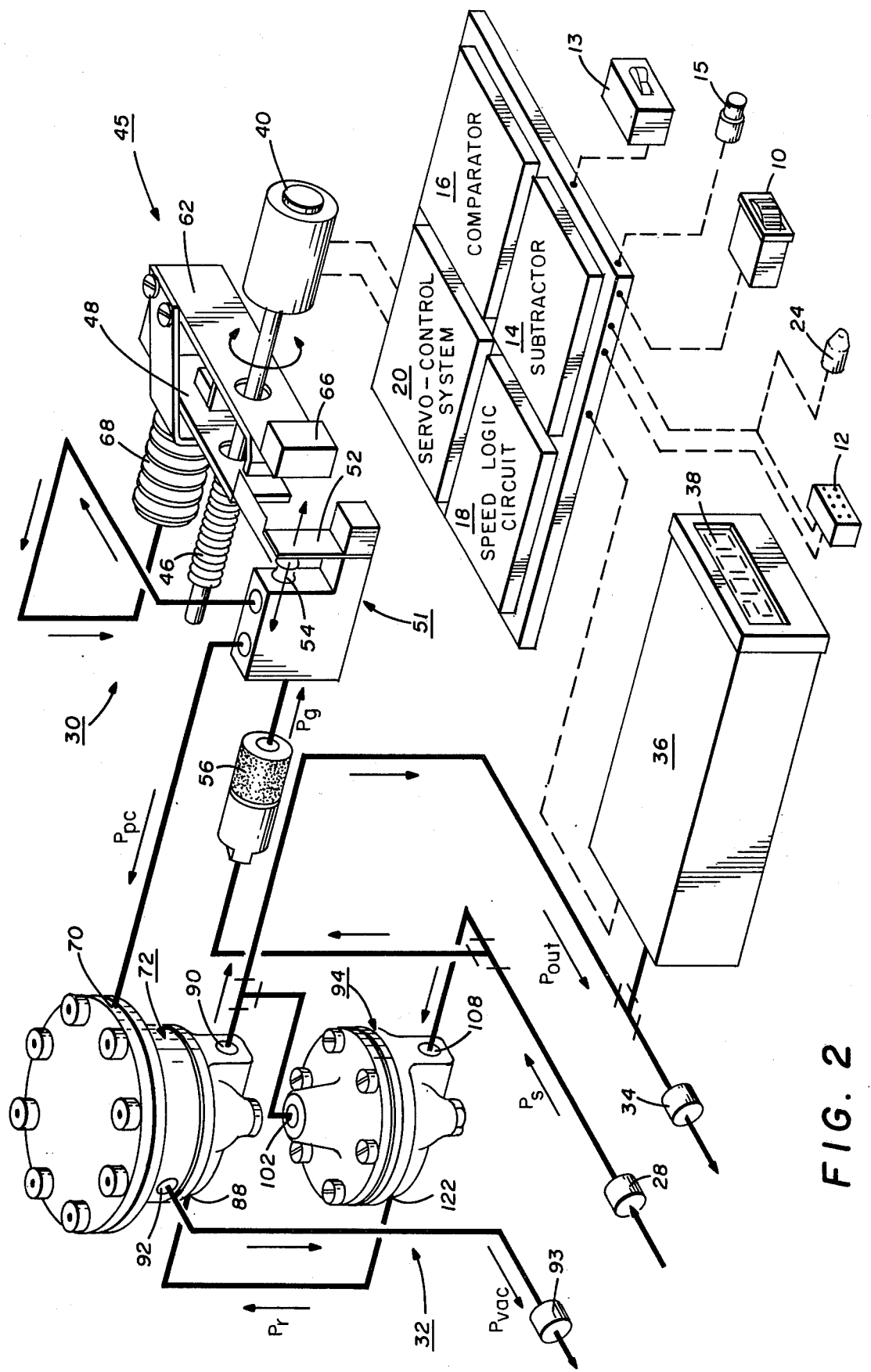
FIG. 2 is an isometric exploded schematic illustration of principal apparatus components.
Figure 2A:
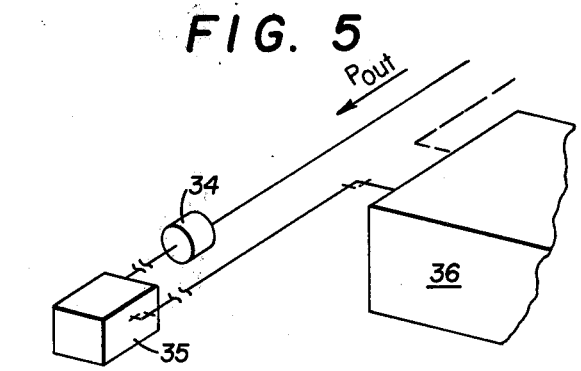
FIG. 2A is a fragmentary optional alternative to the apparatus arrangement of FIG. 2.

Referring initially to FIGS. 1 and 2 of the drawings, set point operation is effected by a BCD pressure command signal supplied optionally from either a multi-digit selector switch 10 or by an external BCD, TTL compatible input command applied to connector 12 as by external computer 17. Either mode is actuated by selector switch 13. Button 15 enters command of switch 10 while connector 12 enters external input command into electronic logic comprised of subtractor circuit 14, comparator circuit 16 and speed logic circuit 18 for operating servo-control system 20. Each of these circuits are known as for example disclosed in *Design of Digital Systems*, J. B. Peatman, McGraw Hill, 1972. A ready light 24 when energized indicates that coincidence of output pressure and set point has been achieved. Fluid supply pressure $P_s$ of pressure value greater than that to be set in operation of the unit is received at an inlet connection 28 from where it is supplied via conduit to the primary low pressure control system generally designated 30, and to the secondary pressure regulation system designated 32. From system 32, as will be understood, fluid pressure $P_{out}$ is supplied to outlet 34 to which utilization apparatus 35 can be connected as shown in FIG. 2A.

Looped in parallel with outlet pressure $P_{out}$ at 34 is a digital BCD emitting pressure sensing element 36. Such a unit is commercially available under the trademarks ASHCROFT and DIGIGAUGE. Operation of sensor 36 includes a continuous digital display 38 of measured controller pressure values and a continuous emitting of a corresponding BCD input signal to subtractor circuit 14. In response, the subtractor circuit determines the difference between the set point command and pressure measurement signals to produce an error signal that is provided to comparator 16. The comparator, with speed logic circuit 18, determines the rate at which output pressure $P_{out}$ should be changed to reduce the error to zero. Once determined, servo-control system 20 is actuated to operate a speed controlled D.C. motor 40 in a forced balance beam assembly 45 of low pressure control system 30.

Figure 4:
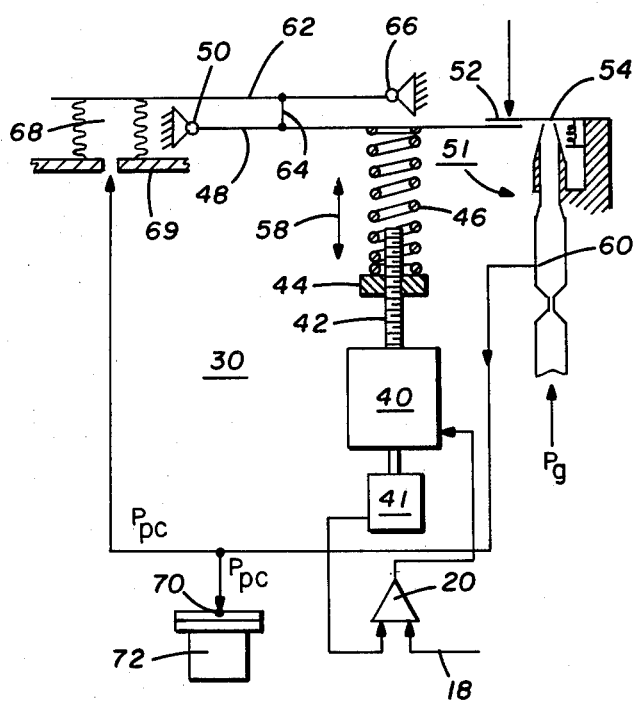
FIG. 4 is a diagramtic illustration of the primary pressure regulator of FIG. 3.
Figure 3:
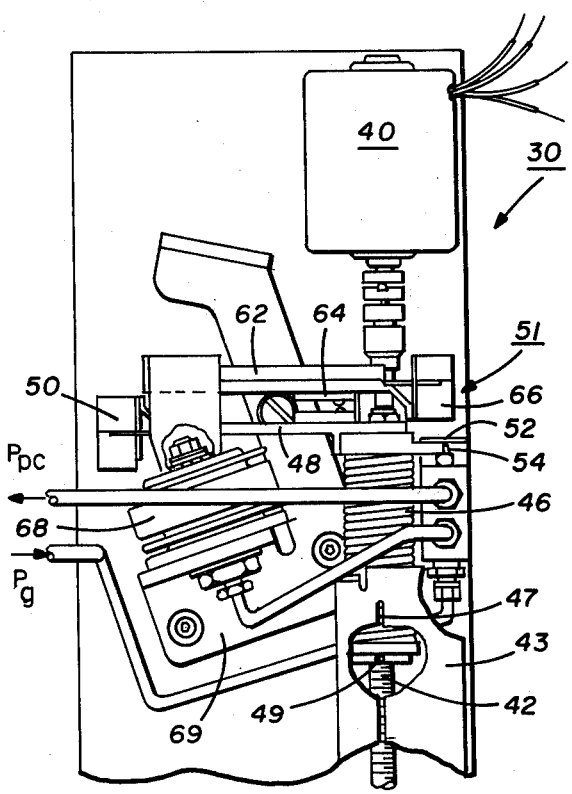
FIG. 3 is an elevation view partially in section of the primary low pressure control regulator.

With reference also to FIGS. 3 and 4, voltage applied to motor 40 is monitored by the digital control circuit as determined by the foregoing error differential such that it will produce a rate change of output pressure $P_{out}$ proportional to motor voltage. For this purpose motor 40, which includes a signal feedback tachometer 41, drives lead screw 42 causing coaxial advance of a block 44 supporting one end of a feedback spring 46. A slot 47 in plate 43 guides pin 49 to prevent rotation of block 44. The other end of spring 46 is secured to a forward beam 48 pivoted at flexure block 50 for operably displacing flapper 52 toward and away from nozzle 54 forming nozzle-flapper amplifier assembly 51. Low pressure air $P_g$ is continuously supplied to the nozzle-flapper assembly through high to low pressure regulator 56 while varying the clearance between flapper 52 and nozzle 54 changes the output control pressure $P_{pc}$ at outlet 60 in a well known manner. The amplifier assembly includes a constant bleed exhaust through the nozzle-flapper clearance.

Concomitantly with movement of forward beam 48 in the direction of arrow 58, rear beam 62 being linked via span block 64 and pivoted at flexure 66 operates to expand and contract bellows 68 supported on bracket 69. At the same time, increasing and decreasing the clearance between flapper 52 and nozzle 54 in response to extension and contraction of spring 46 enables increased and decreased control pressure $P_{pc}$ respectively to be emitted from outlet 60 to both bellows 68 and to the dome inlet connection 70 of the secondary pressure regulator 72. The effect of increasing the pressure supplied internally of bellows 68 is to urge rear beam 62 in a direction counter to that of beam 48 until a force balance relation is achieved therebetween.

Figure 5:
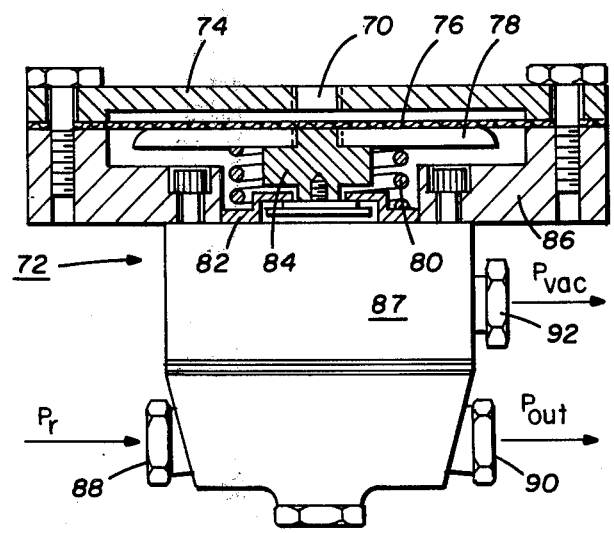
FIG. 5 is an elevation partially in section of the secondary high/low pressure regulator.

The secondary high/low pressure regulator 72, as best seen in FIG. 5, generally comprises a modified standard diaphragm nulling regulator with tapped exhaust in which a force input is required to produce a pressure output. Such regulators are commercially available, for example, as a Series 40 regulator from Moore Products, Inc. of Springhouse, Pennsylvania. The sectioned portions of FIG. 5 represent the modifications to a basic Moore Products regulator for the purposes hereof. Briefly, the topside of regulator 72 above body 87 comprises a dome having an upper dome plate 74 securing a flexible diaphragm 76 supported on its underside by a backup plate 78. A coil spring 80 compressed between plate 78 and a retainer 82 biases the diaphragm upward in opposition to the inlet pilot pressure $P_{pc}$ received at inlet 70 from low pressure control system 30. As herein utilized, spring 80 enables regulator 72 to operate at negative pressure by producing a negative force in the regulator input for negative output pressure thus eliminating the need to otherwise apply vacuum to the dome. An adapter 84 provides alignment support for plate 78 while a lower dome plate 86 in cooperation with upper plate 74 serves to enclose the assembly. The underside of the dome regulator body 87 includes a pressure inlet 88, a pressure outlet 90 and a vacuum exhaust 92 communicating with vacuum connection 93. In this manner, increasing or decreasing pilot pressure supplied from low pressure system 30 to inlet connection 70 produces a corresponding change of pressure $P_{out}$ from outlet 90 on the basis of the output $P_r$ of a differential pressure pre-regulator 94 supplied to inlet 88.

Figure 7:
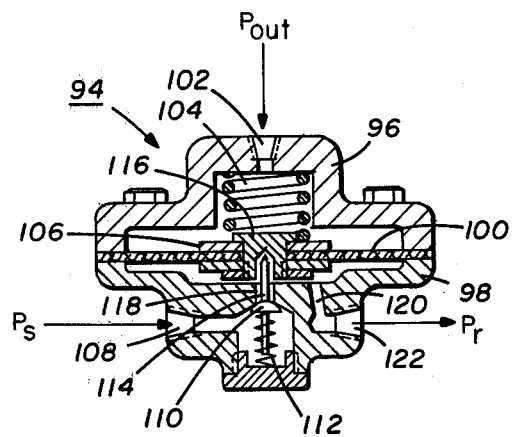
FIG. 7 is a sectional elevation through the differential pressure pre-regulator.

Pre-regulator 94, as will now be described with reference to FIG. 7 serves to maintain minimum required pressure drop accross regulator 72 thereby minimizing air consumption, i.e., flow through the exhaust port to maintain regulator operation. The regulator is of a type commercially available and briefly is comprised of an upper housing 96 and a lower housing 98 assembled together for securing a flexible diaphragm 100 therebetween. In the top face of the upper housing is an inlet connection 102 for receiving pressure output $P_{out}$ from secondary regulator 72. Within the upper housing a constant differential spring 104 acts against the diaphragm in concert with $P_{out}$. A stiffening plate 106 with adapter 116 serves to reinforce the diaphragm.

Formed in bottom housing 98 is a high pressure inlet 108 for receiving fluid supply pressure $P_s$ from system connection 28 that communicates against displaceable poppet 110. The poppet in turn is biased by a coiled return spring 112 toward closed position of passage 118 and with pin 114 reacting against the underside of adapter 116 opposes the downward forces applied against the diaphragm. In a well known manner, movement of poppet 110 by an excess downward force against the diaphragm opens passage 118 to flow decreasing the pressure drop to passage 120 and outlet connection 122 supplying fluid pressure $P_r$. This enables increased pressure $P_{out}$ supplied from regulator 72 to inlet 102 of regulator 94 to cause increasingly downward movement of diaphragm 100 and effect an increased outlet pressure $P_r$ at 122 for feedback to the inlet 88 of regulator 72. Generally $P_r$ is on the order of 500–600 psig and at least 30 psig above $P_{out}$ to be effected as to minimize exhaust flow. These relationships can be clearly seen in the flow charts of FIG. 6 with the accompanying graphical representations.

Figure 8:
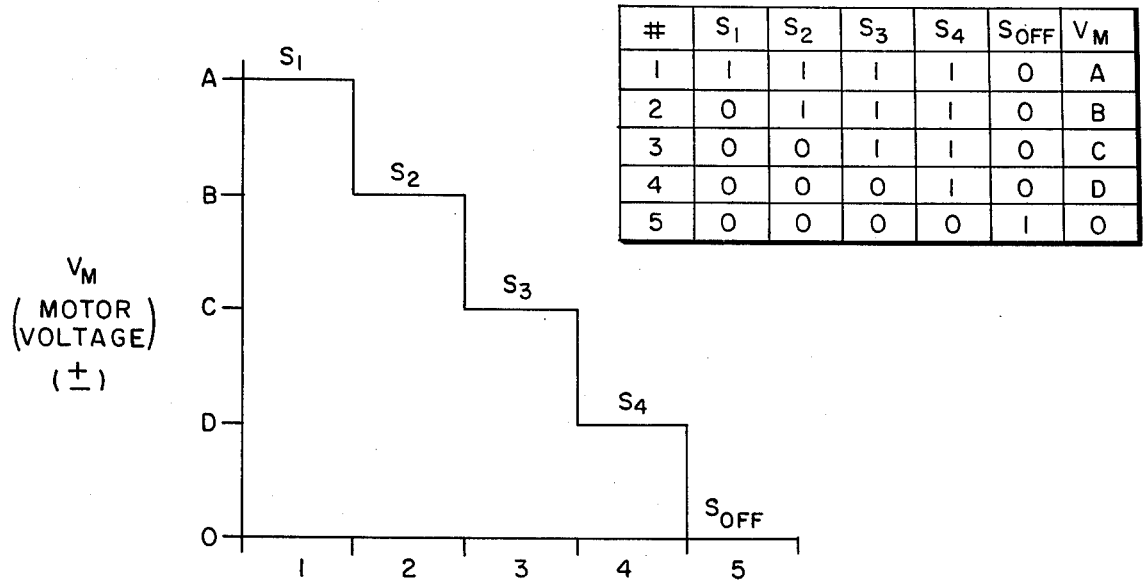
FIG. 8 is a diagramatic graphical representation of the speed logic circuit command.
Figure 9:
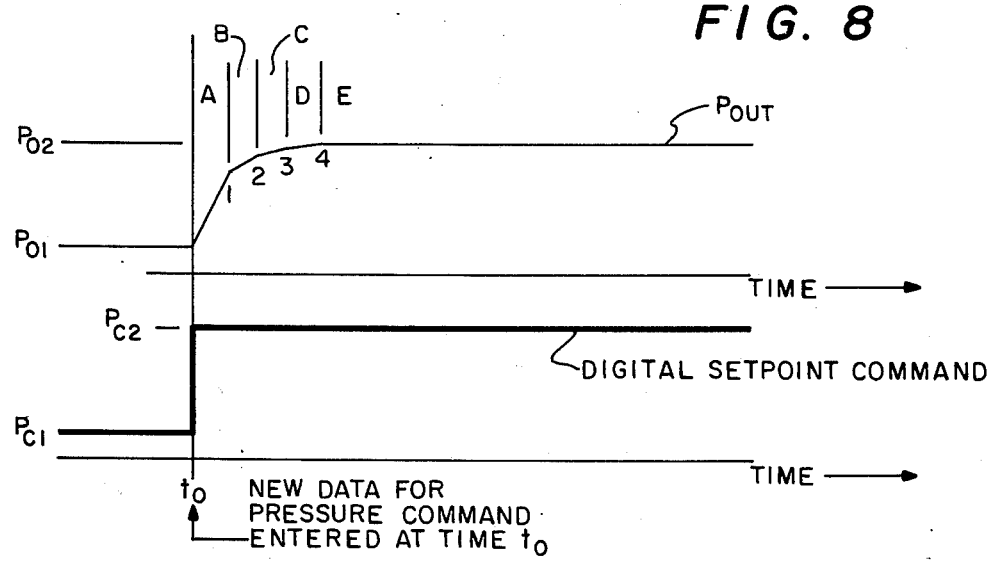
FIG. 9 is a graphical representation of pressure versus time ramp rate variation of the speed logic circuit command.
Figure 10:
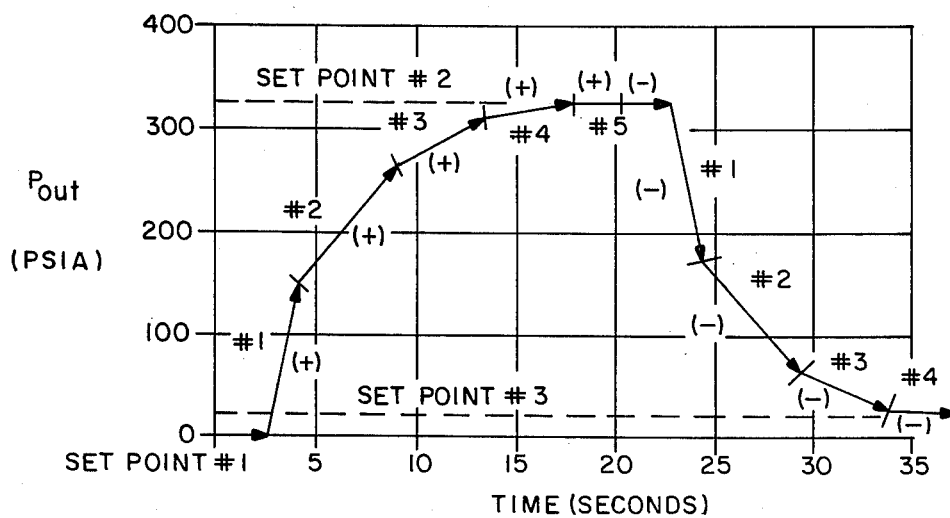
FIG. 10 is a graphical representation of a typical output pressure time response to a step-wise increase and subsequent decrease in set point command.

Operation of the apparatus can be understood with reference to the foregoing Figs. in combination with the electronic logic to be described with further reference to FIGS. 8, 9 and 10. Sensor 36 is first zeroed at atmospheric pressure as by setting it to barometric pressure with its inlet open to atmosphere or by evacuating the inlet to full vacuum before setting the "zero". After zeroing, supply pressure $P_s$ and vacuum $P_{vac}$ are provided at connections 28 and 93, respectively, and the set point input command signal is supplied to selector 27 optionally by either thumb switch 10 or connector 12 for transmission to subtractor circuit 14. This input becomes the subtrahend S. With the unit operative, values of system pressure at connection 34 measured by sensor 36 are supplied as an output BCD signal therefrom to subtractor circuit 14 to become the minuend M. The error or difference M-S is transmitted to comparator circuit 16 where it is compared to a plurality of fixed percentage values of full scale range of the instrument. In the preferred embodiment four such percentage values or steps are utilized as will be understood.

The determined comparison is then transmitted to speed logic circuit 18 in which one of the speed signals designated as S1, S2, S3, S4 and $S_{off}$ in FIG. 8, is selected by the logic to obtain the required ramp rate (pressure vs. time) of FIG. 9. That is, if the error is of the largest magnitude, then S1, S2, S3, S4 are logic "1" and $S_{off}$ is logic "0" thereby actuating the highest ramp rate "A" of FIG. 9. The remaining ramp rates respectively designated "B", "C", "D" and "E" are of lesser magnitude with the last representing the zero speed achieved at set point operation.

Assuming the required set point has the comparison value at the highest magnitude indicating the largest ramp rate "A", servo motor 40 of the primary low pressure controlled system 30 drives lead screw 42 in the first error reduction step at its highest revolutions per minute causing rapid extension of feedback spring 46. Extension of the spring is followed by forward beam 48 moving flapper 52 toward nozzle outlet 54 for decreasing the clearance therebetween. The effect of the latter is to increase output pilot pressure $P_{pc}$ from outlet 60 for transmission to inward of bellows 68 and to connection 70 of dome regulator 72. Increasing bellows pressure causes the bellows to extend against rear beam 62 moving it oppositely to beam 48 until the opposing forces acting on the beams achieve a momentary force balance therebetween.

At the same time, increased pilot pressure $P_{pc}$ to regulator inlet 70 causes its output $P_{out}$ to likewise increase thus increasing the pressure to both inlet 102 of differential pressure pre-regulator 94 and to sensor 36. The former in turn increases its outlet pressure $P_r$ at 122 supplied to input 88 of regulator 72 while the changing pressure value measured by sensor 36 transmits updated BCD information to subtractor circuit 14. The foregoing sequence is then repeated until the $S_{off}$ signal is transmitted indicating pressure set point achievement. By virtue of the foregoing closed loop system, sub atmospheric operation is possible. Introduction of vacuum pressure $P_{vac}$ at exhaust connection 92 of regulator 72 acts as the vacuum source while pressure pre-regulator 94 acts to decrease supply to regulator 72 such that the vacuum source becomes dominant. Bias spring 80 allows gauge pressure operation $P_{pc}$ of regulator 72 as stated supra with the only limiting factor as to minimal absolute pressure operation being the drawdown flow capacity of the introduced vacuum. By varying the feedback signal of tachometer 41 the ramp rate can be proportionately controlled. Preferably, the ramp rates are selected to afford a given relationship to each other whereby overshoot from too high a rate and delayed set point achievement from too slow a rate are both avoided.

By the above description there has been disclosed novel pressure regulating apparatus for producing a control pressure corresponding to a pre-programmed BCD set point command. By converting a BCD signal of measured output pressure jointly supplied to electronic logic with that of the set point value, an error difference is operable in operating a forced balance servo-system for generating a control pressure to change the output pressure. Utilizing a variable ramp rate reduction by a seriatim of repetitive steps in arriving at the pressure standard affords full scale traverse on the order of fifteen seconds with full scale accuracy on the order of 0.03 percent. Accuracy is maintained on the order of plus or minus 0.02 percent without overshoot of programmed pressure value as previously incurred with prior art-type devices. Whereas the invention has been described as principally useful for establishing a digital pressure standard, it should be recognized that by a simple piping change placing sensor 36 series connected downstream of remotely located utilization apparatus 35 receiving $P_{out}$ from connection 34, the apparatus can similarly be used for direct external pressure monitoring.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. Pressure regulating apparatus comprising in combination:
    a. variably settable first regulator means in which to receive a pressure fluid supply from a pressure source and emit the received fluid at a controlled pressure differential from that at which it is received;
    b. variably settable second regulator means receiving the emitted fluid from said first regulator means and operative for emitting a controlled differential pressure output of received fluid for supply as a control pressure to said first regulator means for controllably setting the controlled pressure differential emitted by said first regulator means;
    c. sensing means for measuring the pressure of fluid discharge emitted from said second regulator means and to emit a BCD signal corresponding to the pressure value thereof;
    d. input means operative for establishing a BCD set point pressure command signal for the value of fluid discharge from said second regulator means; and
    e. logic means receiving said BCD signals from said sensing means and said input means and operatively effective in response to the signal differential therebetween to repetitively reset said second regulator means for reducing said signal differential until the value of output pressure from said second regulator means corresponds to the set point pressure command signal of said input means.

2. Pressure regulating apparatus according to claim 1 in which said logic means is operative to effect reduction of said signal differential at variable rates over the full range differential capacity between said signals.

3. Pressure regulating apparatus comprising in combination:
    a. inlet means in which to receive a pressure fluid supply from a pressure source;
    b. variably settable regulator means operative for emitting a controlled pressure output of fluid supply received from said inlet means;
    c. sensing means for measuring the pressure of fluid discharge from said regulator means and to emit a BCD signal corresponding to the pressure value thereof;
    d. input means operative for establishing a BCD set point pressure command signal for the value of fluid discharge from said regulator means; and p1 e. logic means receiving said BCD signals and operatively effective in response to the signal differential therebetween to repetitively reset said regulator means for reducing said signal differential until the value of output pressure from said regulator means corresponds to the set point pressure command signal of said input means; said logic means including means operative to effect reduction of said signal differential at variable rates over the full range differential capacity between said signals in a plurality of seriatimly effected rate reduction steps.

4. Pressure regulating apparatus according to claim 3 in which said logic means includes a subtractor circuit for emitting a subtractor signal corresponding to the difference between said received signals and a comparator circuit receiving said subtractor signal for comparing it to a plurality of range percentage values and emitting a comparator signal corresponding to the percentage value to which the subtractor signal compared.

5. Pressure regulating apparatus according to claim 4 in which said logic means includes a speed logic circuit receiving said comparator signal and responsive thereto for selecting the said rate reduction step to be operative.

6. Pressure regulating apparatus according to claim 5 in which said rate reduction steps are characterized as effecting successive decreasing reduction rates from full range to near said point achievement in the determined differential between said logic received signals.

7. Pressure regulating apparatus according to claim 3 including pilot pressure means operative by said logic means to emit a pilot pressure correlated to the reduction rate to be effected, said pilot pressure means being connected to said regulator means for its emitted pilot pressure to set the control pressure output emitted by said regulator means.

8. Pressure regulating apparatus according to claim 7 in which said pilot pressure means comprises a servo motor actuated by said logic means and a flapper/nozzle operative in a force balanced system by said servo motor for emitting a pilot pressure correlated in value to the operational level of said servo motor.

9. Pressure regulating apparatus according to claim 8 including differential pre-regulator means connected intervening between said inlet means and said regulator means, said pre-regulator means being variably presettable by the controlled output emitted by said regulator means for varying the pressure of fluid supplied to said regulator means.

10. Pressure regulating apparatus according to claim 9 in which said regulator means is operative to emit negative controlled pressure output in response to a negative set point established by said input means.

11. Pressure regulating apparatus according to claim 9 in which said logic means includes a subtractor circuit for emitting a subtractor signal corresponding to the difference between said received signals and a comparator circuit receiving said subtractor signal for comparing it to a plurality of range percentage values and emitting a comparator signal corresponding to the percentage value to which the subtractor signal compared.

12. Pressure regulating apparatus according to claim 11 in which said logic means includes a speed logic circuit receiving said comparator signal and responsive thereto for selecting the said rate reduction step to be operative.

13. Pressure regulating apparatus according to claim 12 in which said rate reduction steps are characterized as effecting successive decreasing reduction rates from full range to near set point achievement in the determined differential between said logic received signals.

14. Pressure regulating apparatus comprising in combination:
   a. variably settable first regulator means in which to receive a pressure fluid supply from a pressure source and emit the received fluid at a controlled pressure differential from that at which it is received;
   b. variable settable second regulator means receiving the emitted fluid from said first regulator means and operative for emitting a controlled differential pressure output of received fluid for supply both as a control pressure to said first regulator means for controllably setting the controlled pressure differential emitted by said first regulator means and to a connection for utilization apparatus to be actuated thereby;
   c. sensing means adapted for measuring the pressure of fluid at the utilization apparatus and to emit a BCD signal corresponding to the pressure value thereof;
   d. input means operative for establishing a BCD set point pressure command signal for the value of fluid discharge from said second regulator means; and
   e. logic means receiving said BCD signals from said sensing means and said input means and operatively effective in response to the signal differential therebetween to repetitively reset said second regulator means for reducing said signal differential until the value of output pressure at the utilization apparatus generally corresponds to the set point pressure command signal of said input means.

* * * * *